May 31, 1966  K. EICKMANN  3,253,806
CONTROL MEANS IN A HYDRAULIC DRIVEN HELICOPTER
Filed May 20, 1964  4 Sheets-Sheet 1

INVENTOR.
KARL EICKMANN

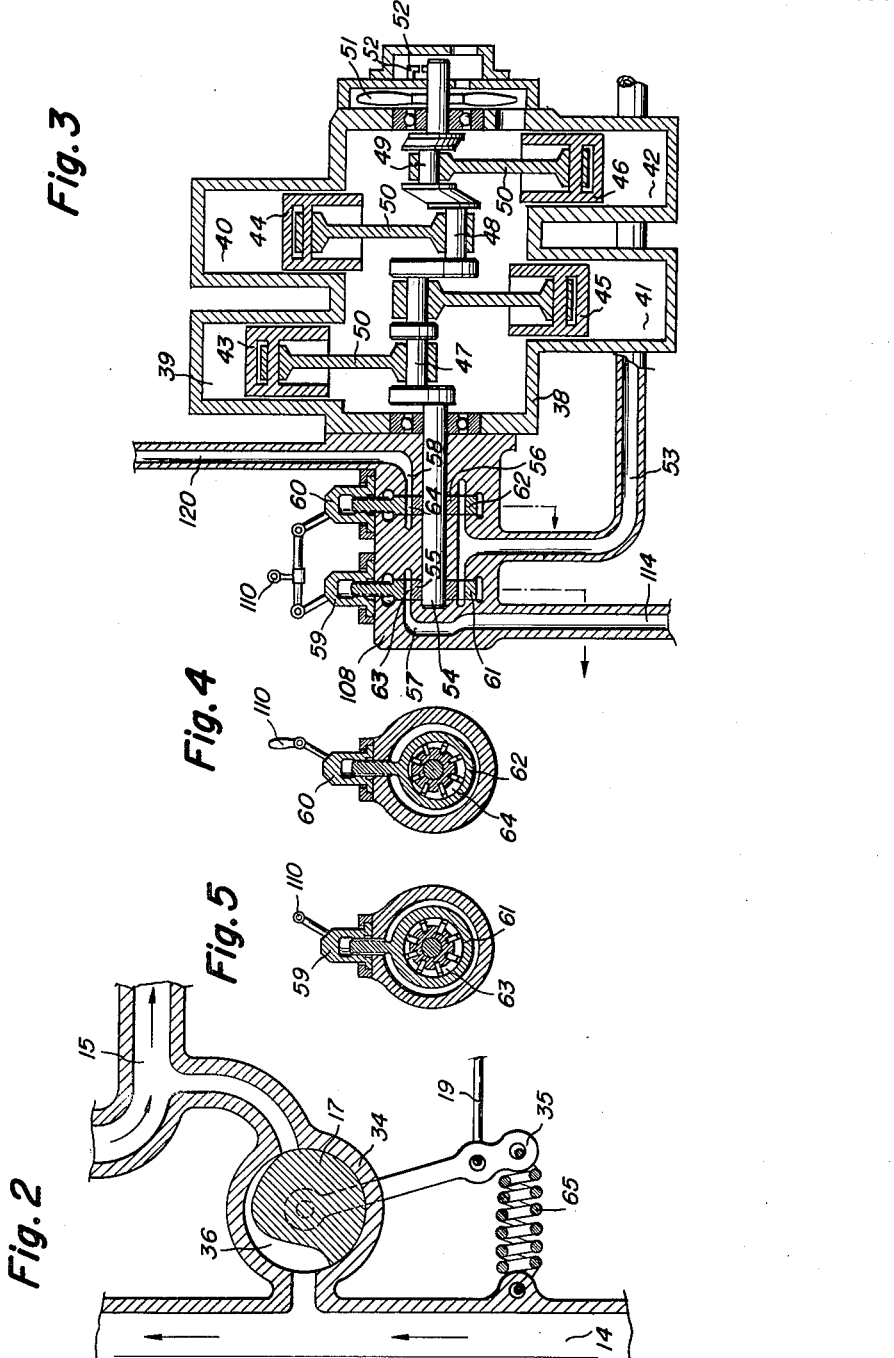

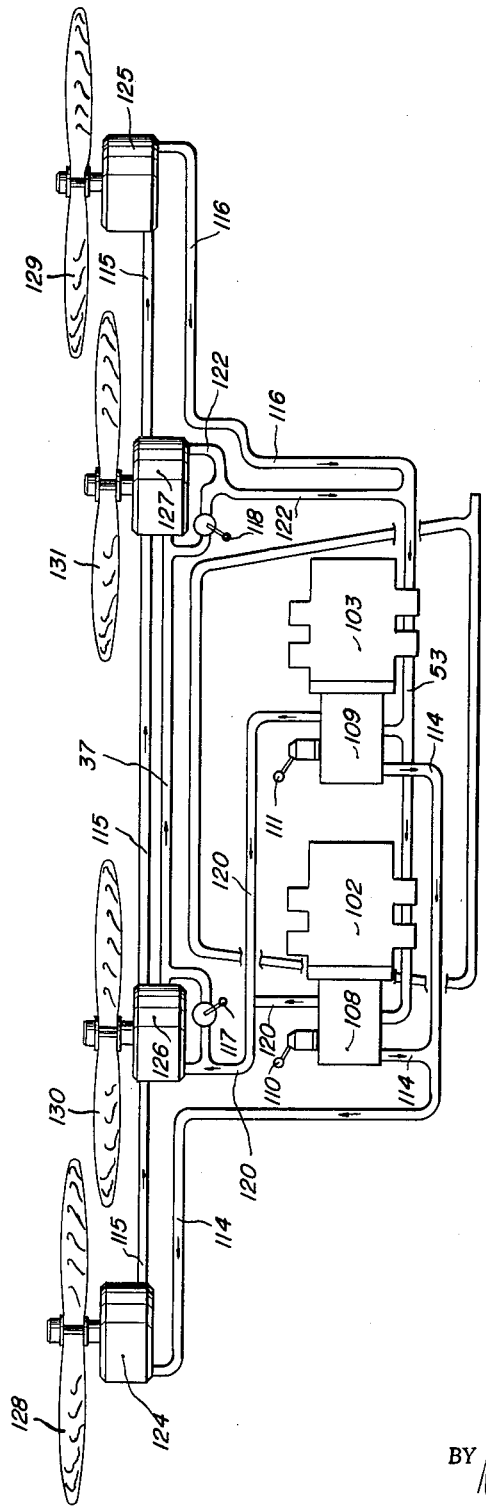

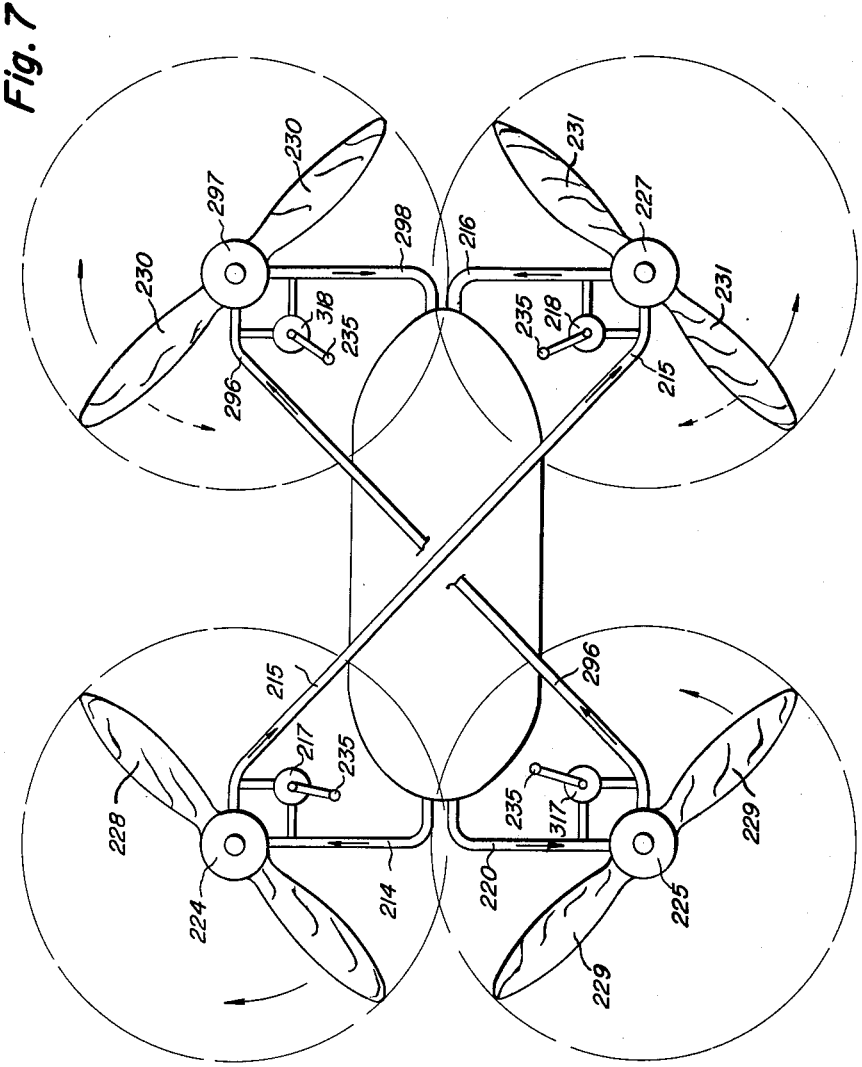

United States Patent Office 3,253,806
Patented May 31, 1966

3,253,806
CONTROL MEANS IN A HYDRAULIC
DRIVEN HELICOPTER
Karl Eickmann, 2420 Isshiki, Hayama-machi,
Kanagawa-ken, Japan
Filed May 20, 1964, Ser. No. 368,820
16 Claims. (Cl. 244—17.23)

This is a continuation-in-part of my co-pending application No. 310,263 filed September 30, 1963.

This invention relates to control means in a hydraulic driven helicopter wherein at least two propellers are driven by two hydraulic motors which are connected in series after each other.

In my above-mentioned patent application, a hydraulic driven helicopter is disclosed which comprises a power plant which produces a flow or flows of hydraulic fluid to a first hydraulic motor which drives a propeller directly or indirectly. The flow of hydraulic fluid leaves the first hydraulic motor and is directed into a second hydraulic motor whereby a second propeller is driven by the second motor and is then returned to a tank or into the fluid flow producing device.

In such helicopters, if both hydraulic motors are of equal displacement volume, both hydraulic motors will rotate substantially with the same rotary velocity and thereby will also rotate both propellers with the same angular velocity so that a cabin of the helicopter, which might be located below and medial to both propellers, will stably be borne in the air.

However, such helicopters have no means for controlling the forward or backward movement of the helicopter by the said two propellers only.

It is the purpose of this invention to overcome this difficulty and to provide control means for varying the rotary velocity of both of the propellers with a parallel change of the rotary velocity or with a slightly different change of the rotary velocity of the propellers in a series fluid flow.

It is therefore the first object of this invention to use a control means for varying the delivery quantity or displacement volume of the fluid flow producing device for varying the flow quantity of fluid through the helicopter fluid propeller driving system or systems so that the rotary velocity of the hydraulic motors, which are connected in series are changed substantially parallel to each other.

The second object of this invention is, to provide control valves between at least each two conduits of the hydraulic flow system for changing the rotary velocity of the different propellers slightly relatively to each other.

And it is the third object of this invention to provide a safe two-flow or multi-flow driven helicopter with moment equalization and at least one control valve between two pipes of each of the two-flows or of a plurality of two flows.

Another object of the invention is to provide a helicopter which has two propellers in series behind each other and at least two other propellers which are driven by two separated flows with the same delivery quantity. Such combined driven helicopter has the feature, that two propellers can be used for the control for the forward and backwards movement while the other two or a plurality of the other propellers can mainly be used to sustain the helicopter in the air. The hydraulic motors of these propellers can thereby be loaded with a higher pressure than the two propellers which are connected in series.

More details and features of the invention will become apparent from the study of the drawing and from the descriptions thereof.

FIG. 2 is a section through an adjustable communication valve of the invention employed with the helicopter.

FIG. 3 is a longitudinal sectional view of an embodiment of a fluid flow producing device of the invention.

FIGS. 4 and 5 show sectional views taken along lines IV—IV or V—V respectively, of FIG. 3.

FIG. 6 is a view similar to FIG. 1 of another embodiment of the invention, and

FIG. 7 is a top plan view of from above upon a two-flow driven helicopter of another embodiment of the invention wherein the propeller moments equalize each other.

Figure 1:
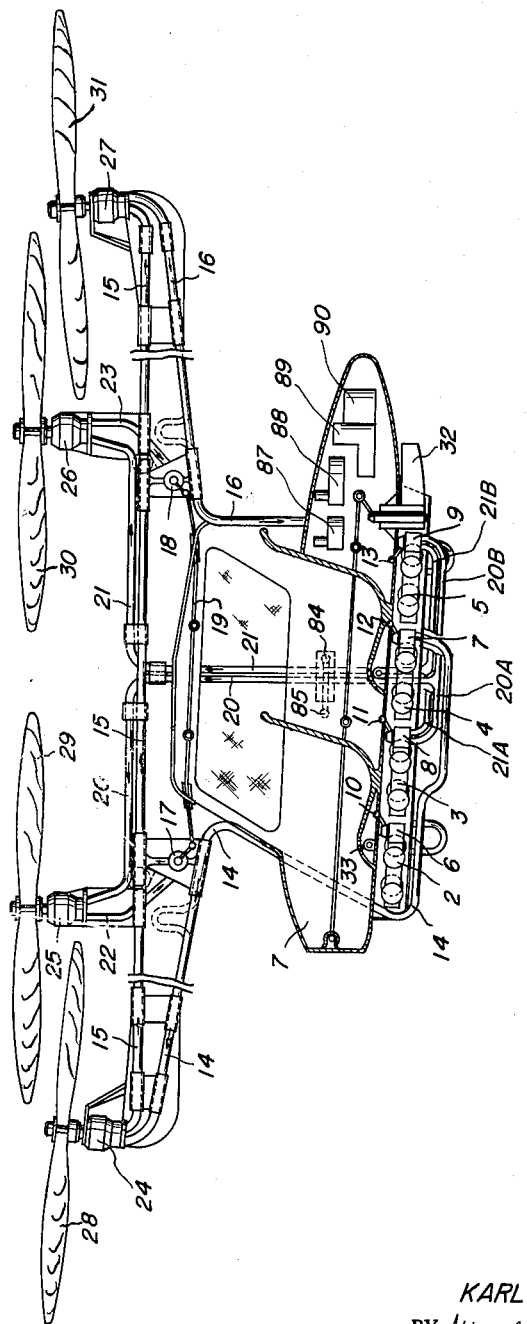
FIG. 1 is a somewhat schematic partial elevational and longitudinal view of the helicopter constructed in accordance with the invention.

Reference numeral 1 represents the body of the helicopter or of an air-cushion vehicle in FIG. 1. Power plants, like gas-turbines, combustion engines, atomic power plants, rotary combustion engines or the like are represented by positions 2, 3, 4 and 5. The power plants are arranged to drive respective associated pumps, preferably variable output pumps. The pumps may be connected directly to the respective power plant or power plants. Positions 6 and 7 show each one variable one-flow pump while positions 8 and 9 show variable two-flow pumps. Each variable pump has a respective adjustment controller 10, 11, 12 or 13 which has the purpose to varify the displacement volumes of the chambers in the respective pumps. Instead of providing power plants and pumps, it would also be possible to provide hydrofluid flow producing devices like hydrofluid conveying combustion engines, hydrofluid conveying rotary combustion engines or the like and the term "pump" used herein is intended to include such devices.

When the power plants, fluid flow producing devices or engines are operating, then each of the pumps sucks fluid, preferably liquid, in from the return flow pipe 16 or from a respective tank, without referential number, which may be located in or on the body 1 of the helicopter. The pump 6 delivers a flow of fluid under pressure P3 into the delivery passage, pipe or tube 14 and the pump 7 also delivers a flow of fluid under pressure P3 into the same pipe 14. Both pumps 6 and 7 supply a flow of fluid under pressure into the same passage, which is hereafter called, the first flow delivery pipe 14. From the first flow delivery pipe 14, the flow of fluid under pressure P3 flows into the first hydraulic motor 24 and revolves the rotor therein, whereby the propeller 28 becomes also revolved. The flow of fluid leaves the hydraulic motor 24 and flows through the medial passage with a pressure P2, pipe or tube 15 which is hereafter called the first flow medial pipe 15 and flows through the medial pipe 15 into the second hydraulic motor 27 and forces the rotor of hydraulic motor 27 to revolve. Thereby, also the second propeller 31 is rotated and the flow of fluid leaves the second hydraulic motor 27 through the flow return pipe 16. Thereafter, the return flow pipe 16 is at the low fluid pressure P3 and the fluid may flow into a respective tank or into the respective entrance ports of the pumps 6 and 7.

The amount of the pressure P3, medial pressure P2 and the low pressure P1, depends on the actual design, on the size and pressures of the respective pumping means and of the respective hydraulic motors. At the present time a pressure of about 2,000 to 6,000 p.s.i. in the high pressure first flow delivery tube 14 is suitable. To give an example how the differences between the respective pressures are, it might be assumed that a pressure of 3,040 p.s.i. is present as pressure P3 in the first flow delivery pipe 14. The medial pressure in the first flow medial pipe 15 may then be substantially 1,540 p.s.i. as pressure P2 while the low pressure in the first flow return pipe 16 may then be the pressure P3 of about 40 p.s.i. Therefrom, it can be seen, that a pressure drop of 1,500 p.s.i. will act in hydraulic motor 24 to force the propeller 28 to rotate, and a pressure drop of 1,500 p.s.i. acts in the hydraulic motor 27 for rotating the propeller 31.

Both propellers, the first propeller 28 and the second propeller 31, may be of the same size and configuration, so that at the situation here described, both propellers supply the same lifting ability to the helicopter due to the same pressure drop and due to the same flow quantity or fluid quantity which acts on, in or through the first and second hydraulic motor 24 and 27. The propellers 28 and 31 may either rotate in the same direction or in opposite directions, depending on the actual design.

A first adjustable communication valve 17 is located between the first flow delivery pipe 14 and first flow medial pipe 15. If the first adjustable communication valve 17 is closed then a flow of fluid out from the first flow delivery pipe 14 through the first adjustable communication valve 17 into the first flow medial pipe 15 is prevented. On the contrary, if the first adjustable communication valve 17 is opened, then a small quantity of the flow of fluid under pressure P3 in the first flow delivery pipe 14 can pass through the first adjustable communication valve 17 into the first medial pipe 15. The first adjustable communication valve 17 can be opened steplessly and smoothly between the closed position and the opened position. At the opened position a small cross-section is opened so that a small quantity of flow of the first flow delivery pipe can flow through the said first adjustable communication valve.

An example of the first adjustable communication valve is shown in a sectional view in FIG. 2.

As can be seen in FIG. 2, a respective part of a pipe extends from the first flow delivery pipe 14 to the controller casing 34 of the first adjustable communication valve 17. Another part of a pipe extends from the controller casing 34 of the first adjustable communication valve 17 to the first flow medial pipe 15. Inside of the controller casing 34 there is a first adjustable communication valve 17. The rotary valve 17 can be pivoted in a limited extent by the control handle 35. A notch 36 is provided in the rotary control body 17 of the first adjustable communication valve 17. If in the situation of FIG. 2, the control handle 35 is pivoted in clockwise direction then the notch 36 provides a communication between the respective pipe parts of the first flow delivery tube 14 and the first flow medial pipe 15. As the control handle 35 is rotated in a clockwise direction a bigger section of the notch 36 communicates between the respective pipes 14 and 15. The notch 36 is preferably so, that the right end of it or one end of it has a very small sized cross-section which enlarges substantially in the direction to the other end of notch; whereby it becomes possible to open very small cross-sections as well as somewhat larger cross-sections, so that very small or somewhat larger quantities of fluid can pass from pipe 14 through notch 36 of first adjustable communication valve 17 into the first flow medial pipe 15. It should be noted that the cross-section of the notch 36 is comparatively small and it enlarges substantially in one circumferential direction because only a very small quantity of the whole flow which is present in the first flow delivery pipe 14 shall be allowed to pass through the first adjustable communication valve 17.

If the square section in the notch 36 would be too big, then a too large part of flow could pass from the pipe 14 through the communication valve 17 into the pipe 15. That would probably turn the helicopter in the air; and therefore, care must be taken that the cross-section through the notch 36 does not become too large. The cross-sectional area through the notch 36 depends also on the pressure drop between the first flow delivery pipe 14 and the medial pipe 15.

A spring 65 may be provided between the first flow delivery pipe 14 and the control handle 35 or otherwise placed on the handle 35 so that the handle 35 is respectively closed in neutral position.

The valves combining handle 19 may also be connected with the control handle 35 for connecting the respective control handles of the first adjustable communication valve 17 and the second adjustable communication valve 18.

If the control handle 35 is moved a counterclockwise direction from the position of FIG. 2, then the first adjustment communication valve 17 is closed and the flow of fluid or of a part thereof, out of the first flow delivery pipe 14 and into the first flow medial pipe 15 is prevented.

A second adjustable communication valve 18 is located between the first flow medial pipe 15 and the first flow return pipe 16. The second adjustable communication valve 18 may be similar to that of the first communication valve 17. By opening the second adjustable communication valve 18, a part of the flow of fluid in the first flow medial pipe 15 can pass through the second adjustable communication valve 18 into the first flow return pipe 16.

The valves combination handle 19 may connect the control handles of the first adjustable communication valve 17 and of the second adjustable communication valve 18. If that is the case, as shown in FIG. 1, then, if the valves communication handle is moved forward, then, due to the spring 65, the first adjustable communication valve 17 opens, so that a part of the flow of the first flow delivery pipe 14 passes, due to the pressure drop, through the first adjustable communication valve into the first flow medial pipe 15. Thereby, the delivery or flow quantity inside of the first flow medial pipe 15 becomes somewhat greater than the quantity of fluid which flows from the first flow delivery pipe 14 through the first hydraulic motor 24. As a consequence of this, the first propeller 28 revolves somewhat more slowly while at the same time the second propeller 31 is forced to higher rotary velocity. The propeller 31 revolves with higher speed due to the fact that the somewhat larger flow quantity flows from the first flow medial pipe 15 through the second hydraulic motor 27. Because the first propeller 28 revolves somewhat more slowly the pressure drop for driving the first hydraulic motor 24 becomes less than the pressure drop for driving the second hydraulic motor 27. Consequently the pressure in the first flow medial pipe 15 increases accordingly.

If, as described above, the first propeller 28 revolves somewhat more slowly, while the second propeller 31 revolves faster, the lifting capacity of the second propeller 31 becomes somewhat higher than that of the first propeller 28. The helicopter is lifted at its rear end and this causes the air stream which flows through the propellers 31 and 28 to become inclined, so that a component of force appears in forward direction, acting on the helicopter, and moves the helicopter forward.

If thereafter the forward movement of the helicopter shall be stopped, or if a backward movement of the helicopter is desired, then the valve combining handle 19 may be moved in a backward direction. As a consequence of this the first adjustable communication valve 17 will be closed while on the contrary the second adjustable communication valve 18 will be opened. Due to the opening of the second adjustable communication valve 18 a part of the flow in the first flow medial pipe 15 flows through the second adjustable communication valve 18 into the first flow return pipe 16. Thereby, the flow quantity which flows through the second hydraulic motor 27 becomes somewhat smaller, so that the propeller 31 rotates slower than the first propeller 28. As a consequence of this the helicopter becomes somewhat lifted on its front so that the resultant of the air stream which flows through the first propeller 28 and the second propeller 31 produces a component of a force which is in backward direction and stops the forward movement of the helicopter or moves the helicopter backwards.

Between the maximum backward and forward moving position, each suitable amount of movement can be obtained due to the possibility to control the first adjustable communication valve and the second adjustable communication valve either combined or separated and with very fine fractions of variation.

Instead of using a valve combining handle 19, it would also be possible to adjust the first adjustable communication valve 17 and the second adjustable communication valve 18 independently from each other. While adjustable communication valves were described above, it should be recognized that a similar control of the forward or backward movement of the helicopter by changing the rotary velocity of two propellers, it would also be possible, to use variable displacement hydromotors for driving the propellers and to verify the displacement volumes of the chambers in the hydraulic motors for changing the rotary velocity of the respective propeller or propellers.

The second adjustable communication valve may be similar to the section which is demonstrated in FIG. 2, of the first adjustable communication valve 17.

It should be noted that both pumps 6 and 7 are delivering into the same first flow delivery pipe 14. Pump 6 is driven by the independent power plant or combustion engine 2 while the pump 7 is driven by another independent power plant or combustion engine. Thus if for instance the pump 6 would be damaged, then the pump 7 continues to deliver a flow of fluid so that the helicopter can remain in the air because the respective first and second propellers are continuing to revolve. If the pump 6 would be damaged, then the delivery quantity of the pump 7 might be increased by a respective adjustment handle 12 so that the power plant or combustion engine 4 supplies the respective larger quantity of power at least for a short time.

The same could happen vice versa, if, for instance, the power plant or combustion engine 4 fails to operate, then the combustion engine or power plant 2 might continue to drive the pump 6 and the power of the power plant or combustion engine 2 may be increased by the gas lever or control lever 33 while the flow delivery quantity may be adjusted by the pump control handle 10 of the pump 6.

The system of this invention to use several independent power plants and several independent pumps or fluid flow producing devices for delivery of a flow of fluid into the same first flow delivery pipe makes the helicopter of this invention especially safe during its operation in the air. If one engine or one pump or some engines or some pumps or a power plant or several power plants or a fluid flow producing device or fluid flow producing devices of the first flow accidentally stop operation or fail to operate, then the rest of the power plants, engines, fluid flow producing devices or pumps are continuing their operation so that the continuance of the flow of the first flow of fluid or the fraction thereof is assured and thereby the helicopter can be kept in the air or move for an emergency landing.

According to another feature, the first and the second flow of fluid is used in the helicopter to bear the helicopter in the air. This is another safety means and another means for the suitable balancing of the helicopter in the air.

In the embodiment of FIG. 1, the power plant drives the two flow pump 8. The two flow pump is provided with an adjusting device 11 for varying or adjusting the displacement volume of chambers of the two flow pump 8. The two flow pump 8 delivers one flow of fluid into the second flow delivery pipe 20a and another flow of fluid into the third flow delivery pipe 21a.

The power plant or combustion engine 5 drives the two flow pump 9. The two flow pump 9 has an adjustment handle 13 for adjusting the displacement of the chambers in the two flow pump 9 for varying the delivery quantity of the two flow pump 9. The two flow pump delivers one flow of fluid into the second flow delivery pipe 20b while another flow of fluid is delivered by the two flow pump 9 into the third flow delivery pipe 21b. The second flow delivery pipes 20a and 20b are combined together into the second flow delivery pipe 20 while the third flow delivery pipes 21a and 21b are combined together into the third flow delivery pipe 21.

The second flow delivery pipe 20 passes the second flow of fluid under pressure into the third hydraulic motor 25 for revolving the third propeller 29. After this work is done the respective part of the third flow leaves the third hydraulic motor 25 through the second flow return pipe 22 and flows thereafter into a tank or into the respective two flow delivery pump 8 or 9.

The third flow of fluid flows through the third flow delivery pipe 21 into the fourth hydraulic motor 26 and provides the rotating of the rotary means therein so that the fourth propeller 30 becomes revolved. After this work is done the respective part of the third flow of fluid leaves the fourth hydraulic motor 26 through the third flow return pipe 23. It thereafter flows into a respective tank or into the respective hydraulic pump 8 or 9.

The feature of this cycle is, that, if both flows 20 and 21 or in other words, the second flow and third flow, are of the same delivery quantity due to the fact that the two-flow pumps are proportional or with equal delivery quantity two flow pumps, then both, the third hydraulic motor and the fourth hydraulic motor will rotate with the same rotary velocity and if the third and fourth propeller 29 and 30 are of equal size and dimension, they will then have the same lifting capacity during operation.

If, on the contrary, a higher lifting flow is desired in the third propeller 29 or in the fourth propeller 30, then, instead of using two flow pumps with equal delivery quantity the pumps 8 and 9 may be two flow pumps with proportional delivery quantity and with proportional sizes of the displacement chambers therein. Then a respective larger quantity of fluid is passed for driving the third propeller or for driving the fourth propeller, depending on the situation.

Due to the fact that both pumps 8 and 9 are delivering into the second flow pipe 20 and into the third flow pipe 21, so that no communication happens between the second flow in the pipe 20 and the third flow in the pipe 21, regardless which rotary velocity the power plants or engines 3 or 5 have, the rotary velocity of the third propeller 29 and of the fourth propeller 30 will remain equal or parallel.

If one of the engines 3 or 5 or of the two flow pumps 8 or 9 fails to operate, then the other engine or pump will continue the operation and the delivery of the second and of the third flow functions thereof or of into the second flow pipe 20 and into the third flow pipe 21 will continue so that the third propeller 29 and the fourth propeller 30 are continuing their operation. A respective adjustment of the rotary velocity of the healthy remaining engine and of the healthy remaining pump, for instance by handle 11 or 13 can be done to keep the aircraft in the air or to move it for a smooth emergency landing.

It is however, important that the two flow pump 8 and 9 must deliver two independent flows so that two independent flows are produced inside of each of the respective pump in respective separated chambers or separated groups of chambers therein.

It is of further interest, that, in order to spare weight of the helicopter, aircraft or air cushion vehicle, that the pump or two flow pump 6, 7, 8 or 9 must not be variable in both directions, but that it is enough if they are variable in one delivery direction only and it also enough if the delivery quantity of the respective pump can be varied in a limited area.

An important feature is also that all the engines can continue the operation with a given rotary velocity which might be most economical and that the whole helicopter can be operated by the adjustment devices of the pumps like 10, 11, 12, 13 and by the respective adjustment communication valve 17 and/or 18. During operation of the aircraft the gas handle 33 can remain untouched and unused. This control means enables a very smooth control of the rotary velocity of all of the propellers and moreover an immediate change of the respective rotary velocity of the propellers, probably in a fraction of a second, for instance in a hundredth part of a second.

The hydraulic operated helicopter or air cushion vehicle of this invention can therefore be more accurately and more speedily be controlled than conventional aircrafts or helicopters which might be driven by combustion engines, turbines, external power plants or the like, because the change of the rotary velocity of such conventional machines needs a certain time, since the masses of its rotary parts would then have to be accelerated.

Another embodiment of a helicopter of this invention is shown in FIG. 6. In this case the power plant 102 and 103 are two cycle combustion engines. The two cycle combustion engines have the feature that they are relatively less in weight and that they are very inexpensive. The power plant 102 drives the two flow variable hydraulic pump 108 while the power plant 103 drives the two flow variable hydraulic pump 109. The delivery quantity of the hydraulic pumps 108 or 109 respectively becomes changed or can be changed by the control handle 110 or 111. The body of the helicopter of this embodiment is shown by the reference numeral 101. Each of the hydraulic pumps 108 and 109 delivers a first flow of hydraulic fluid into the first flow delivery pipe 114. The first flow of hydraulic fluid flows through the first flow delivery pipe 114 for driving the first hydraulic motor 124 which revolves the first propeller 128. After this work the first flow leaves the first hydraulic motor 124 and flows through the first flow medial pipe 115 into the second hydraulic motor 125 and revolves the rotor thereof. Thereby the second hydraulic motor 125 is driven and the first flow returns through the first flow return pipe 115 into the entrance pipe 53 and therefrom into the entrance port of the two flow pumps 108 and 109. The second flow of fluid leaves each of the hydraulic pumps 108 and 109 through the second flow delivery pipe 120 and flows thereafter through the second flow delivery pipe or tube 120 into the third hydraulic motor 125 and revolves the rotor therein. Thereby the third propeller 130 is driven. After this work, the second flow leaves the third hydraulic motor 126 and flows through the second flow medial pipe 37 into the fourth hydraulic motor 127 and revolves the rotor thereof, whereby the fourth propeller 131 becomes driven. After this work, the second flow leaves the fourth hydraulic motor 127 and flows through the second flow return pipe 122 into the entrance pipe 53 and therefrom into the respective hydraulic pump 108 and 109.

Instead of using two power plants 102 and 103 with two flow pumps 108 and 109 it would be possible to use another plurality of power plants and of two flow hydraulic pumps, if all of them would supply their first flow of hydraulic fluid into the first flow delivery pipe 114 and their second flow of hydraulic fluid into the second flow delivery pipe 120.

A first adjustment communication valve 117 may be set between the second flow delivery tube 120 and second flow medial tube 37 while a second adjustable communication valve 118 may be set between the second flow medial pipe 37 and the second flow return pipe 122. The first and the second adjustable communication valves 117 and 118 may be operated similarly as the first or second adjustable communication valves 17 or 18 of FIG. 1.

The feature of the embodiment of FIG. 6 is also, that, if one power plant or one two flow pump fails to operate that then the other power plants and two flow pumps are able to drive the helicopter, to keep it in the air or to enable a smooth and safe emergency landing.

Another feature of the two flow system of the embodiments of helicopters or air cushion vehicles of FIGS. 1 and 6 is, that if one of the pipe breaks, that then only two propellers will stop, while the other two propellers will continue to revolve and will keep the aircraft in the air. Therefore, the helicopters of this invention and of the parental patent application are very safe and include a number of safety devices for preventing crashing of the helicopter, aircraft or air cushion vehicle.

Each of the flows may have separated fluid containing tanks, so that if a passage, pipe or tube breaks, only one flow is lost, while the other flows remain operable and keep its reserve of hydraulic fluid in its own hydraulic or hydro-fluid supply tank.

FIGURE 3 shows the power plant or combustion engine 102 or 103 with the thereto connected two flow pump 108 or 109 in another scale and in a principle and simplified demonstration.

Position 38 represents the casing of the two cycle combustion engine, while positions 39, 40, 41 and 42 represent respective cylinders for the two cycle combustion engine. The pistons 43, 44, 45 and 46 are moving in the respective combustion engine cylinders 39, 40, 41 or 42 and they are driving by the respective connection rods 50, the crank shaft of the combustion engine. The crank shaft has different crank parts 47, 48 and 49 in order to secure that each of the pistons supplies a power stroke after other pistons during one revolution of the crank shaft. Position 51 shows a compressor for supplying the chamber in the casing 38 with air or air-fuel mixture of a respective pressure, so that the respective cylinders will accordingly be filled with air fuel mixture during the respective position of the respective piston. Position 52 shows the ignition timer for timing the ignition of the charge in the cylinders 39, 40, 41, and 42, one after another during one revolution and at the respective suitable time. The crank shaft is directly connected for driving the shaft 54 of the two flow pump while the casing of the two flow pump is connected to the engine casing 38. The entrance pipe 53 supplies fluid to the pump during the suction stroke or intake stroke of the respective chambers in the two flow pump into chambers 63 or 62 of the two flow pump. During the discharge stroke of the respective chambers 63 or 62 the fluid becomes discharged out from the respective working chambers in the two flow pump. Thereby, a first flow of fluid becomes discharged from the respective discharging chambers 63 into the first flow delivery tube 114. On the other hand the second flow of fluid becomes discharged from the respective discharging chambers 62 of the two flow pump into the second flow pipe 120.

The FIGS. 4 and 5 show respective sections through a pump or two flow pump of FIG. 3. Each of the pumping devices in the two flow pump has a respective displacement volume adjustment casing 61 respectively 62.

The position of the displacement volume adjustment casing 61 or 62 can be changed by the respective displacement volume adjustment handle 59 or 60. The displacement volume adjustment handles 59 or 60 are combined together by the respective delivery adjustment controller 110. Due to this combination, if the delivery adjustment controller 110 is moved then the displacement volume adjustment handles of the two flow pump change the displacement quantity of the displacement chambers 63 or 64 parallel or equal to each other.

Inside of the two flow pump are two rotors provided, the pump rotor 55 and the pump rotor 56. In or on each of the rotors are respective pumping chambers provided, for instance, the pumping chambers 63 on the pump rotor 55 and on the other hand the pumping chambers 64 on or around the rotor 56.

In the embodiments shown in FIGS. 3 to 5 it will be seen that two pumps are provided on the same pump shaft 54 and that they are together making the variable two flow pump.

But instead of combining two pumps together on the same shaft 54 in one two flow delivery pump it would also be possible to use such two flow pumps which are producing two separated and independent flows in the same rotor. Such kind of two flow pumps are described in my copending patent application Serial Number 328,395.

While in the embodiment of this invention the pumps and power plants were different machineries, it would also be possible to use fluid flow producing devices, for instance, hydro-fluid conveying combustion engines.

Also any other suitable multi-fluid producing or conveying combustion engine or power plant could be used.

Referring to FIG. 7, the body of the helicopter is shown by position 201. The power plants or fluid flow producing means are below the cabin 201 and therefore invisible in FIG. 7. The first flow delivery passage 214 delivers a first flow of fluid under pressure for driving hydraulic motor 224. Thereafter the first flow of fluid leaves hydraulic motor 224 and flows through the first flow medial passage 215 and therethrough to hydraulic motor 227. After driving hydraulic motor 227 for flowing through the return pipe 216 back to the tank or to the fluid flow producing device.

The second flow of fluid under pressure flows through the second flow delivery passage 220 into the second hydraulic motor 225 and revolves this motor. The second flow of fluid flows thereafter through the second flow medial passage 296 to the hydraulic motor 297, revolving the same. Thereafter, the second flow of fluid leaves the hydraulic motor 297 for flowing back through the second flow return passage 298 to the tank or to the fluid flow producing device.

Hydraulic motor 224 drives propeller 228; motor 227 drives propeller 231, motor 225 drives propeller 229 and the hydraulic motor 297 drives or revolves propeller 230.

If a propeller revolves, a moment is necessary to revolve the propeller. This moment exerts a reaction on the helicopter and tends to turn the helicopter in the air. However, such turning tendency of the helicopter can be balanced out by inclining the respective propeller, so that the air stream through the propeller circle acts against the propeller moment and balances the same out, so that the resultant of turning forces, acting on the helicopter is zero or almost zero.

During the operation of the communcation control valves of the helicopter of this invention the rotary velocity of the thereby controlled propellers changes slightly, and that would result in a change of the moment of the respective propeller and thereby of the turn-tending components acting on the helicopter. This might result in turning the helicopter sidewards in the air.

In order to prevent such turning tendency generally or during the operation of the communication control valves of this invention according to the third object of this invention, the propellers driven by the first flow of fluid revolve vice versa to the propellers driven by the second flow of fluid.

For example, propellers 225 and 231 revolve clockwise. See the dotted arrow on propeller 231. On the contrary to this, the propellers 229 and 230 revolve anticlockwise. See the dotted arrow on propeller 230. Thereby the turn-tending moments of propellers 228 and 231 are balanced out by the vice versa acting turn-tending moments of propellers 229 and 230.

A similar moments balancing effect can be obtained, if the propellers driven by the first flow, revolve vice versa and the propellers driven by the second flow revolve also vice versa. This is shown as an embodiment of the invention by the arrows on the propellers in FIG. 7.

In the embodiment of FIG. 7, the first propellers 228 and 229 of the helicopter are driven by the first or second flow of fluid revolve also vice versa.

All turn-tending propeller moments are thereby balancing each other so that the sum of the turn-tending propeller moments acting on the helicopter becomes zero or almost zero.

The adjustable communication valve 217 is provided between passages 214 and 215; the adjustable communication valve 317 is provided between passages 220 and 296, while similar valves 317 and 318 are provided between passages 215 and 216 respectively 296 and 298.

The adjustable communication valves 217, 218, 317 and 318 may be similar as valves 17 and 18 of other figures and they may have control handles 235. The control handles 235 of the said valves of same valves thereof may be connected together by combination handles. Those are not shown in FIG. 7 because they depend on considerations of the actual design.

Thus, if for example, valves 217 and 317 are operated at the same time in the same extent, then during such operation the propeller moments of propellers 228 and 229 are balancing each other and so do the moments of propellers 230 and 231 if valves 218 and 318 are operated at the same time in the same extent. If all four valves 217, 317, 218, and 318 are operated at the same time to the same extent, then the propellers 228, 229, 230, and 231 balance each other and no turn-tending resultant remains on the helicopter during the operation of the adjustable communication control valves.

Instead of building helicopters with four propellers, the means and objects of this invention can also be applied to helicopters which have a plurality of two propellers.

Thus, by the means of this invention the helicopters can be kept stable in the air without turning-tendency during the rest in the air, during the normal continuous travel in the air, and also during the acceleration or speed slow down of the helicopter in the air, when the communication control valves are operated and thereby the rotary velocities of the propellers of the helicopter are changed. The helicopter of this invention is therefore very stable and safe during flight, take off and landing and the control of the helicopter.

A conventional two-way or plurality-way control valve 84 may be provided as shown by dotted lines in FIG. 1 connected into the delivery passages 20 and 21 of the second flow and third flow. Control piston 85 is provided, as known in the art in the valve 84. Thus, if the control piston 85 is in central position, the flows in pasasges 20 and 21 remain separated from each other and flow via the valve 84 only in their respective separated delivery passages 20 or 21. But, if the control piston 85 is moved out of its neutral position in one or the other direction, then respective communications are changed inside of control valve 84, so that a small part of the flow in passage 20 becomes forced to flow into the passage 21 or a small part of the flow of passage 21 becomes forced to flow into the passage 20. Thereby the respective propeller 29 or 30 revolves somewhat faster than the others, so that the position or movement of the helicopter can be also controlled by the valve 84 with its control piston 85, especially in order to control the rotary speed of propellers which are revolved by separated flows.

Two-flow driven or multi-flow driven helicopters of this invention are preferably provided with separated fluid tanks for each flow. These are shown by positions 87 and 88 of FIG. 1. If one flow system breaks, then the other flow system takes the fluid out of its independent tank 87 or 88. That prevents accidental crashing of this helicopter.

It is convenient to provide coolers or radiators 89 and/or 90 to each flow of fluid for preventing overheating of the fluid. This is also shown by positions 89 and 90 in FIG. 1.

The vehicle described in this invention was named a helicopter. But it should be appreciated that such kinds of vehicle and the means of this invention cannot be used as a helicopter only but also for an air cushion vehicle which might hover near the surface, thereby using the known air cushion effect or in other vehicles. In such cases, respective covers may surround the propellers of the vehicle so that the cushion effect over the surface of the earth or water can be obtained.

Though the invention is described by way of some of the embodiments, it should be understood that modifications or other combinations are possible, depending on design considerations or on the actual situation, without departing from the principles of this invention.

What is claimed is:

1. A fluid borne vehicle comprising a body, first and second rotors rotatably mounted on said body at respective locations adjacent two opposite extremities of said body for rotation about respective substantially vertical axes, a positive displacement fluid motor connected to each of said rotors for rotating each rotor in proportion to the speed of rotation of said fluid motor, fluid flow producing means connected to each of said fluid motors in series for directing fluid under pressure first to one motor and then to the next, and control means connected to said fluid flow producing means for selectively varying the fluid flow to said fluid motors for varying the rotational of said fluid motors and the rotors associated therewith for changing the attitude of said vehicle including a fluid delivery conduit connected to one of said fluid motors, a medial conduit between said fluid motors, a bypass conduit connected between said medial conduit and said fluid delivery conduit, and valve means for regulating the flow from said delivery conduit to said fluid medial conduit through said bypass conduit to control the attitude of the aircraft.

2. A fluid born vehicle comprising a body, first and second rotors rotatably mounted on said body, first and second fluid operated motors directly connected to respective first and second rotors for rotating said rotors at speeds in proportion to the rotation of said fluid motors, a fluid delivery conduit connected to said first motor for delivering fluid to said first motor to rotate said first motor at a speed determined by the flow of fluid delivered thereto, a fluid medial conduit connected between said first and second fluid motors for delivering fluid discharged by said first fluid motor to said second fluid motor, fluid flow producing means connected between said fluid delivery conduit and said second fluid operated motor for supplying a flow of fluid to said fluid delivery conduit, said first and second motors and said fluid medial conduit and receiving a flow from said second fluid motor, and control means connected to said delivery conduit for varying the flow of fluid to said first and second fluid operated motors including a bypass conduit connected between said medial conduit and said fluid delivery conduit, and valve means for regulating the flow from said delivery conduit to said fluid medial conduit through said bypass conduit to control the attitude of the aircraft 3. A helicopter comprising a body, first and second rotors rotatably mounted on said body about substantially vertical axes, first and second fluid operated motors directly connected to respective first and second rotors for rotating said rotors at speeds in proportion to the rotation of said fluid motors, a fluid delivery conduit connected to said first motor for delivering fluid to said first motor to rotate said first motor at a speed determined by the flow of fluid delivered thereto, a fluid medial conduit connected between said first and second fluid motors for delivering fluid discharged by said first fluid motor to said second fluid motor, a fluid flow producing means connected between said fluid delivery conduit and said second fluid operated motor for supplying a flow of fluid to said fluid delivery conduit, control means connected to said delivery conduit for varying the flow of fluid to said first and second fluid operated motors, including a bypass conduit connected between said medial conduit and said fluid delivery conduit, and valve means for regulating the flow from said delivery conduit to said fluid medial conduit through said bypass conduit to control the attitude of the aircraft.

4. A helicopter comprising a body, first and second rotors rotatably mounted on said body, first and second fluid operated motors directly connected to respective first and second rotors for rotating said rotors at speeds in proportion to the rotation of said fluid motors, a fluid delivery conduit connected to said first motor for delivering fluid to said first motor to rotate said first motor at a speed determined by the flow of fluid delivered thereto, a fluid medial conduit connected between said first and second fluid motors for delivering fluid discharged by said first fluid motor to said second fluid motor, a fluid flow producing means connected to said fluid delivery conduit and said second fluid operated motor for supplying a flow of fluid to said fluid delivery conduit, said first and second motors and said fluid medial conduit, and control means connected to said delivery conduit for varying the flow of fluid to said first and second fluid operated motors, including means associated with said fluid flow producing means for controlling the output of fluid therefrom including a bypass conduit connected between said medial conduit and said fluid delivery conduit, and valve means for regulating the flow from said delivery conduit to said fluid medial conduit through said bypass conduit to control the attitude of the aircraft.

5. A helicopter comprising a body, first and second rotors rotatably mounted on said body about substantially vertical axes, first and second fluid operated motors directly connected to respective first and second rotors for rotating said rotors at speeds in proportion to the rotation of said fluid motors, a fluid delivery conduit connected to said first motor for delivering fluid to said first motor to rotate said first motor at a speed determined by the flow of fluid delivered thereto, a fluid medial conduit connected between said first and second fluid motors for delivering fluid discharged by said first fluid motor to said second fluid motor, a fluid flow producing means connected to said fluid delivery conduit and said second fluid operated motor for supplying a flow of fluid to said fluid delivery conduit, said first and second motors and said fluid medial conduit, and control means connected to said delivery conduit for varying the flow of fluid to said first and second fluid operated motors, including at least two separately driven pumps including a bypass conduit connected between said medial conduit and said fluid delivery conduit, and valve means for regulating the flow from said delivery conduit to said fluid medial conduit through said bypass conduit to control the attitude of the aircraft.

6. A helicopter comprising a body, first and second rotors rotatably mounted on said body about substantially vertical axes, first and second fluid operated motors directly connected to respective first and second rotors for rotating said rotors at speeds in accordance with the rotation of said fluid motors, a fluid delivery conduit connected to said first motor for delivering fluid to said first motor to rotate said first motor at a speed in proportion to the flow of fluid delivered thereto, a fluid medial conduit connected between said first and second fluid motors for delivering fluid discharged by said first fluid motor to said second fluid motor, a fluid flow producing means connected between said fluid delivery conduit and said second fluid operated motor for supplying a flow of fluid to said fluid delivery conduit, said first and second motors and said fluid medial conduit, control means connected to said delivery conduit for varying the flow of fluid to said first and second fluid operated motors including a bypass conduit connected between said medial conduit and said fluid delivery conduit, and valve means for regulating the flow from said delivery conduit to said fluid medial conduit through said bypass conduit to control the attitude of the aircraft, third and fourth rotors rotatably mounted on said body about substantially vertical axes, third and fourth fluid operated motors connected to respective third and fourth rotors for rotating said rotors at speeds in proportion to the flow of fluid through said third and fourth fluid operated motors, a second fluid delivery conduit connected to said third motor for delivering fluid to said third motor to rotate said motor and the said third rotor associated therewith, a third fluid delivery conduit connected to said fourth motor for delivering fluid to said fourth motor to rotate said fourth motor and the said fourth rotor associated therewith, and second fluid flow producing means connected to said second fluid delivery conduit and to said third fluid delivery conduit for producing a flow of fluid through said second fluid delivery conduit, said third motor and said third fluid delivery conduit and said fourth motor.

7. A helicopter comprising a body, first and second rotors rotatably mounted on said body about substantially vertical axes, first and second fluid operated motors directly connected to respective first and second rotors for rotating said rotors at speeds in proportion to the rotation of said fluid motors, a fluid delivery conduit connected to said first motor for delivering fluid to said first motor to rotate said first motor at a speed determined by the flow of fluid delivered thereto, a fluid medial conduit connected between said first and second fluid motors for delivering fluid discharged by said first fluid motor to said second fluid motor, a fluid flow producing means connected between said fluid delivery conduit and said second fluid operated motor for supplying a flow of fluid to said fluid delivery conduit, said first and second motors and said fluid medial conduit, control means connected to said delivery conduit for varying the flow of fluid to said first and second fluid operated motors including a bypass conduit connected between said medial conduit and said fluid delivery conduit, and valve means for regulating the flow from said delivery conduit to said fluid medial conduit through said bypass conduit to control the attitude of the aircraft, third and fourth rotors rotatably mounted on said body about substantially vertical axes, third and fourth fluid operated motors connected to respective third and fourth rotors for rotating said rotors at speeds in proportion to the flow of fluid through said third and fourth fluid operated motors, a second fluid delivery conduit connected to said third motor for delivering fluid to said third motor to rotate said motor and the said third rotor associated therewith, a second fluid medial conduit connected between said third and fourth fluid operated motors for delivering fluid discharged by said third fluid motor to said fourth fluid motor, and second fluid flow producing means connected to said second fluid delivery conduit for producing a flow of fluid through said second fluid delivery conduit, said third motor, said second medial conduit and said fourth motor.

8. A helicopter comprising a body, first and second rotors rotatably mounted on said body about substantially vertical axes, first and second fluid operated motors directly connected to respective first and second rotors for rotating said rotors at speeds in accordance with the rotation of said fluid motors, a fluid delivery conduit connected to said first motor for delivering fluid to said first motor to rotate said first motor at a speed in proportion to the flow of fluid delivered thereto, a fluid medial conduit connected between said first and second fluid motors for delivering fluid discharged by said first fluid motor to said second fluid motor, first fluid flow producing means connected to said fluid delivery conduit and said second fluid operated motor for supplying a flow of fluid to said fluid delivery conduit, said first and second motors and said fluid medial conduit, control means connected to said delivery conduit for varying the flow of fluid to said first and second fluid operated motors including a bypass conduit connected between said medial conduit and said fluid delivery conduit, and valve means for regulating the flow from said delivery conduit to said fluid medial conduit through said bypass conduit to control the attitude of the aircraft, third and fourth rotors rotatably mounted on said body about substantially vertical axes, third and fourth fluid operated motors connected to respective third and fourth rotors for rotating said rotors at speeds in proportion to the flow of fluid through said third and fourth fluid operated motors, a second fluid delivery conduit connected to said third motor for delivering fluid to said third motor to rotate said motor and the said third rotor asociated therewith, a second fluid medial conduit connected between said third and fourth fluid operated motors for delivering said fluid discharge by said third fluid motor to said fourth fluid motor, and a second fluid flow producing means connected to said second fluid delivery conduit and to said fourth motor for producing a flow of fluid through said second fluid delivery conduit, said third motor, said second medial conduit and said fourth motor, said first and second flow producing means comprising at least one pump and at least one motor for driving said pump.

9. A helicopter comprising a body, first and second rotors rotatably mounted on said body about substantially vertical axes, first and second fluid operated motors directly connected to respective first and second rotors for rotating said rotors at speeds in proportion to the rotation of said fluid motors, a fluid delivery conduit connected to said first motor for delivering fluid to said first motor to rotate said first motor at a speed determined by the flow of fluid delivered thereto, a fluid medial conduit connected between said first and second fluid motors for delivering fluid discharged by said first fluid motor to said second fluid motor, first fluid flow producing means connected to said fluid delivery conduit and said second fluid operated motor for supplying a flow of fluid to said fluid delivery conduit, said first and second motors and said fluid medial conduit, control means connected to said delivery conduit for varying the flow of fluid to said first and second fluid operated motors including a bypass conduit connected between said medial conduit and said fluid delivery conduit, and valve means for regulating the flow from said delivery conduit to said fluid medial conduit through said bypass conduit to control the attitude of the aircraft, third and fourth rotors rotatably mounted on said body, about substantially vertical axes, third and fourth fluid operated motors connected to respective third and fourth fluid rotors for rotating said rotors at speeds in proportion to the flow of fluid through said third and fourth fluid operated motors, a second fluid delivery conduit connected to said third motor for delivering fluid to said third motor to rotate said motor and said third rotor associated therewith, a second fluid medial conduit connected between said third and fourth fluid operated motors for delivering fluid discharged by said third fluid motor to said fourth fluid motor, and a second fluid flow producing means connected to said second fluid delivery conduit and to said fourth motor for producing a flow of fluid through said second fluid delivery conduit, said third motor, said second medial conduit, and said fourth motor, said second fluid flow producing means and said first fluid flow producing means comprising at least one pump and at least two separate driving motors.

10. A helicopter comprising a body, first and second rotors rotatably mounted on said body about substantially vertical axes, first and second fluid operated motors directly connected to respective first and second rotors for rotating said rotors at speeds in proportion to the rotation of said fluid motors, a fluid delivery conduit connected to said first motor for delivering fluid to said first motor to rotate said first motor at a speed determined by the flow of fluid delivered thereto, a fluid medial conduit connected between said first and second fluid motors for delivering fluid discharged by said first fluid motor to said second fluid motor, a fluid flow producing means connected between said fluid delivery conduit and said second fluid operated motor for supplying a flow of fluid to said fluid delivery conduit, said first and second motors and said fluid medial conduit including a bypass conduit connected between said medial conduit and said fluid delivery conduit, and valve means for regulating the flow from said delivery conduit to said fluid medial conduit through said bypass conduit to control the attitude of the aircraft, control means connected to said delivery conduit for varying the flow of fluid to said first and second fluid operated motors, third and fourth rotors rotatably mounted on said body about substantially vertical axes, third and fourth fluid operated motors connected to respective third and fourth rotors for rotating said rotors at speeds in proportion to the flow of fluid through said third and fourth fluid operated motors, a second fluid delivery conduit connected to said third motor for delivering fluid to said third motor to rotate said motor and the said third rotor associated therewith, a third fluid delivery conduit connected to said fourth motor for delivering fluid to said fourth motor to rotate said fourth motor and the said fourth rotor associated therewith, and second fluid flow producing means connected to said second fluid delivery conduit and to said third fluid delivery conduit for producing a flow of fluid through said second fluid delivery conduit, said third motor and said third fluid delivery conduit and said fourth motor, said second fluid flow producing means comprising at least one two-flow producing pump connected both to said second fluid delivery conduit and said third fluid delivery conduit.

11. A helicopter comprising a body, first and second rotors rotatably mounted on said body about substantially vertical axes, first and second fluid operated motors directly connected to respective first and second rotors for rotating said rotors at speeds in accordance with the rotation of said fluid motors, a fluid delivery conduit connected to said first motor for delivering fluid to said first motor to rotate said first motor at a speed in proportion to the flow of fluid delivered thereto, a fluid medial conduit connected between said first and second fluid motors for delivering fluid discharged by said first fluid motor to said second fluid motor, first fluid flow producing means connected to said fluid delivery conduit and said second fluid operated motor for supplying a flow of fluid to said fluid delivery conduit, said first and second motors and said fluid medial conduit, and control means connected to said delivery conduit for varying the flow of fluid to said first and second fluid operated motors, third and fourth rotors rotatably mounted on said body, third and fourth fluid operated motors connected to respective third and fourth rotors for rotating said rotors at speeds in proportion to the flow of fluid through said third and fourth fluid operated motors, a second fluid delivery conduit connected to said third motor for delivering fluid to said third motor to rotate said motor and the said third rotor associated therewith, a second fluid medial conduit connected between said third and fourth fluid operated motors for delivering fluid discharged by said third fluid motor to said fourth fluid motor, second fluid flow producing means connected to said second fluid delivery conduit and to said fourth motor for producing a flow of fluid through said second fluid delivery conduit, said third motor, said second medial conduit, said first and second fluid flow producing means comprising a plurality of separately driven two-flow producing pumps each connected to deliver fluid to said first delivery fluid conduit and to said second delivery fluid conduit.

12. A helicopter comprising a body, first and second rotors rotatably mounted on said body about substantially vertical axes, first and second fluid operated motors directly connected to respective first and second rotors for rotating said rotors at speeds in proportion to the rotation of said fluid motors, a fluid delivery conduit connected to said first motor for delivering fluid to said first motor to rotate said first motor at a speed determined by the flow of fluid delivered thereto, a fluid medial conduit connected between said first and second fluid motors for delivering fluid discharged by said first fluid motor to said second fluid motor, first fluid flow producing means connected to said fluid delivery conduit and said second fluid operated motor for supplying a flow of fluid to said fluid delivery conduit, said first and second motors and said fluid medial conduit, control means connected to said delivery conduit for varying the flow of fluid to said first and second fluid operated motors, third and fourth rotors rotatably mounted on said body about substantially vertical axes, third and fourth fluid operated motors connected to respective third and fourth rotors for rotating said rotors at speeds in proportion to the flow of fluid through said third and fourth operated motors, a second fluid delivery conduit connected to said third motor for delivering fluid to said third motor to rotate said motor and the said rotor associated therewith, a second fluid medial conduit connected between said third and fourth fluid operated motors for delivering fluid discharged by said third fluid motor to said fourth fluid motor, second fluid flow producing means connected to said second fluid delivery conduit and to said fourth motor for producing a flow of fluid through said second fluid delivery conduit, said third motor, said second medial conduit and said fourth motor, first and second bypass means connected between said fluid delivery conduit and said fluid medial conduit and between said second fluid delivery conduit and said second fluid medial conduit respectively, and control means associated with each of said bypass means for regulating the flow of each of said first, second, third and fourth fluid motors and the rotation of the rotors associated therewith including a bypass conduit connected between said medial conduit and said fluid delivery conduit, and valve means for regulating the flow from said delivery conduit to said fluid medial conduit through said bypass conduit to control the attitude of the aircraft.

13. A helicopter according to claim 12, wherein said control means includes means for bypassing fluid from said first and second flow delivery conduits simultaneously but in opposite directions.

14. A fluid born vehicle including a body, first and second rotors rotatably mounted at respective locations adjacent two opposite extremities of said body for rotation about respective substantially vertical axes, first and second positive displacement fluid motors connected to respective first and second rotors for rotating each rotor, a positive displacement pump, conduit means connecting said pump and said first and second rotors in series, and control means connected to said conduit means for varying the rotative speed of said first and second rotors separately for changing the attitude of said vehicle including a bypass conduit connected between said medial conduit and said fluid delivery conduit, and valve means for regulating the flow from said delivery conduit to said fluid medial conduit through said bypass conduit to control the attitude of the aircraft.

15. A fluid born vehicle comprising a body, first and second rotors rotatably mounted on said body, first and second fluid-operated motors directly connected to respective first and second rotors for rotating said rotors at speeds in proportion to the rotation of said fluid motors, a fluid delivery conduit connected to said first motor for delivering fluid to said first motor to rotate said first motor at a speed determined by the flow of fluid delivered thereto, a fluid medial conduit connected between said first and second fluid motors for delivering fluid discharged by said first fluid motor to said second fluid motor, a return conduit connected to said second fluid motor, fluid flow producing means connected between said return conduit and said fluid delivery conduit, and control means connected between said medial conduit and said return conduit for varying the flow of fluid to said second fluid operated motor including a bypass conduit connected between said medial conduit and said fluid delivery conduit, and valve means for regulating the flow from said delivery conduit to said fluid medial conduit through said bypass conduit to control the attitude of the aircraft.

16. A fluid born vehicle comprising a body, first and second rotors rotatably mounted on said body about substantially vertical axes, first and second fluid-operated motors directly connected to respective first and second rotors for rotating said rotors at speeds in proportion to the rotation of said fluid motors, a fluid delivery conduit connected to said first motor for delivering fluid to said first motor to rotate said first motor at a speed determined by the flow of fluid delivered thereto, a fluid medial conduit connected between said first and second fluid motors for delivering fluid discharged by said first fluid motor to said second fluid motor, a return conduit connected to said second fluid motor, fluid flow producing means connected between said return conduit and said fluid delivery conduit, and control means connected between said medial conduit and said delivery conduit for varying the flow of fluid to said first and second fluid operated motors including a bypass conduit connected between said medial conduit and said fluid delivery conduit, and valve means for regulating the flow from said delivery conduit to said fluid medial conduit through said bypass conduit to control the attitude of the aircraft.

References Cited by the Examiner

UNITED STATES PATENTS

| | | | |
|---|---|---|---|
| 1,012,532 | 1/1911 | Engstrom | 244—60 |
| 1,993,701 | 3/1935 | Avery | 170—135.24 X |
| 2,212,490 | 8/1940 | Adler | 244—53 |
| 2,301,098 | 11/1942 | Twyman | 60—97 |
| 2,454,138 | 11/1948 | Delzer | 244—60 X |
| 2,514,822 | 7/1950 | Wolfe | 170—135.7 X |
| 2,629,568 | 2/1953 | Croshere | 244—17.23 |
| 2,868,476 | 1/1959 | Schlieben | 244—7.3 |

FOREIGN PATENTS

| | | |
|---|---|---|
| 644,524 | 10/1950 | Great Britain. |

MARK NEWMAN, *Primary Examiner.*

JULIUS E. WEST, *Examiner.*

W. E. BURNS, *Assistant Examiner.*